(12) United States Patent
Redi

(10) Patent No.: US 7,483,392 B1
(45) Date of Patent: Jan. 27, 2009

(54) MULTINODE ARRANGEMENT

(75) Inventor: Jason Keith Redi, Belmont, MA (US)

(73) Assignees: BBN Technologies Corp., Cambridge, MA (US); Verizon Corporate Services Group, Inc., New York, NY (US)

( * ) Notice: Subject to any disclaimer, the term of this patent is extended or adjusted under 35 U.S.C. 154(b) by 829 days.

(21) Appl. No.: 10/804,375

(22) Filed: Mar. 19, 2004

(51) Int. Cl.
*H04L 12/28* (2006.01)

(52) U.S. Cl. .................. 370/254; 370/310; 370/328

(58) Field of Classification Search ............... 370/254, 370/310, 328
See application file for complete search history.

(56) References Cited

U.S. PATENT DOCUMENTS

| | | | | |
|---|---|---|---|---|
| 4,534,061 | A | * | 8/1985 | Ulug .......................... 455/17 |
| 5,574,979 | A | * | 11/1996 | West .......................... 455/63.1 |
| 5,726,984 | A | * | 3/1998 | Kubler et al. ............... 370/349 |
| 5,875,179 | A | * | 2/1999 | Tikalsky ...................... 370/315 |
| 6,046,992 | A | * | 4/2000 | Meier et al. ................. 370/338 |
| 6,084,867 | A | * | 7/2000 | Meier .......................... 370/338 |
| 6,130,881 | A | | 10/2000 | Stiller et al. |
| 6,304,556 | B1 | | 10/2001 | Haas |
| 6,407,991 | B1 | * | 6/2002 | Meier .......................... 370/338 |
| 6,445,690 | B2 | | 9/2002 | Sato et al. |
| 6,445,691 | B2 | | 9/2002 | Sato |
| 6,604,201 | B1 | | 8/2003 | Takahashi et al. |
| 6,611,120 | B2 | | 8/2003 | Song et al. |
| 6,727,816 | B1 | * | 4/2004 | Helgeson ..................... 340/540 |
| 6,930,958 | B2 | * | 8/2005 | Goergen ...................... 368/10 |
| 7,061,385 | B2 | * | 6/2006 | Fong et al. .................. 340/573.4 |
| 7,200,130 | B2 | * | 4/2007 | Forstadius et al. .......... 370/338 |
| 2001/0033556 | A1 | | 10/2001 | Krishnamurthy et al. |
| 2001/0034793 | A1 | | 10/2001 | Madruga et al. |
| 2002/0032027 | A1 | * | 3/2002 | Kirani et al. ................. 455/426 |
| 2002/0071395 | A1 | * | 6/2002 | Redi et al. ................... 370/252 |
| 2002/0123365 | A1 | | 9/2002 | Thorson et al. |
| 2002/0145978 | A1 | | 10/2002 | Batsell et al. |
| 2002/0161751 | A1 | | 10/2002 | Mulgund et al. |
| 2004/0012491 | A1 | | 1/2004 | Kulesz et al. |
| 2004/0030571 | A1 | | 2/2004 | Solomon |
| 2004/0152420 | A1 | * | 8/2004 | Redi et al. ................... 455/67.11 |
| 2005/0063360 | A1 | * | 3/2005 | Lowmaster .................. 370/352 |
| 2005/0119025 | A1 | * | 6/2005 | Mohindra et al. .......... 455/552.1 |
| 2005/0201420 | A1 | * | 9/2005 | Bhandari et al. ............ 370/508 |
| 2006/0135145 | A1 | * | 6/2006 | Redi ............................ 455/420 |

FOREIGN PATENT DOCUMENTS

| | | |
|---|---|---|
| WO | WO-00/51360 A1 | 8/2000 |
| WO | WO-01/54044 A1 | 7/2001 |
| WO | WO-02/41521 A2 | 5/2002 |
| WO | WO-02/41521 A3 | 5/2002 |
| WO | WO-2004/003680 A2 | 1/2004 |

* cited by examiner

*Primary Examiner*—Huy D Vu
*Assistant Examiner*—Luat Phung

(57) ABSTRACT

The present invention provides a multinode arrangement that utilizes a plurality of nodes that communicate with each other by RF transmissions and hardwire communications. The use of both hardwire and RF transmission provides the advantages obtained with both forms of transmission.

21 Claims, 2 Drawing Sheets

MULTINODE ARRANGEMENT

STATEMENT REGARDING FEDERALLY SPONSORED RESEARCH OR DEVELOPMENT

This invention was made with government support and is subject to Government DARPA contract number DAAH01-99-C-R-218 for SUB1-00106/FMI Project to Foster Miller. The government has certain rights in the invention.

BACKGROUND

Situations exist where it is desirable to deploy a covert device such as a camera or other suitable device in a tunnel, ventilation shaft, corridor, or other passage. For example, a digital camera may be deployed in a ventilation shaft to observe a suspect or individual who is at a location near an opening in the ventilation shaft. The camera then relays captured digital information back to a user or device of the system through an RF (radio frequency) transmission. The user or device is typically external to the passage where the spy or observation operation is taking place. Such an application, however, is not limited to spy applications. For example, a user of such a system may desire to monitor conditions in an otherwise hostile environment such as a coal mining shaft or other dangerous location by deploying a camera or other device within the shaft, and then relaying information to a user or device external to the shaft.

In such a situation as described above, difficulty arises when attempting to transmit the information back out of the passage. Specifically, the walls of the passage may interfere with the transmission. Also, if the signal strength is increased to a level which is able to penetrate the walls of the passage, such a signal may be intercepted or may require an unrealistic amount of power to generate. As such, the deployment of relays or nodes is sometimes used to establish a communication network between the user or device external to the shaft and the camera or device in the passage. The nodes can be deployed by using a robot or other suitable means which travels down a passage and deploys the nodes from a position where the camera or other device is located to a position where transmission may be received by the user or device external to the passage. The nodes are spaced from each other such that, each node is able to maintain an RF communication link with the adjacent nodes. By this way, information from the device or camera inside the passage may be relayed to the device or user external to the passage. The camera or device is then able to transmit information, such as optical or viewing information from a camera, back to an individual or controller outside the passage.

While the above identified solution does allow the transmission of information at a reduced RF signal strength, some drawbacks exist. Specifically, there still exists a possibility that the RF signal may be intercepted depending on the space of the nodes. One solution to the above identified problem is to string a shielded cable or other similar transmitting means from the internal device to the external device or user, instead of using the RF nodes as described above. However, the logistics of using such a string or cable creates difficulty as such a cable may be visually observed and also may break or get hung along the passage. The present invention was developed in light of these and other drawbacks.

BRIEF DESCRIPTION OF THE DRAWINGS

The present invention will now be described, by way of example, with reference to the accompanying drawings, in which.

DETAILED DESCRIPTION OF AN EMBODIMENT

The present invention provides a multimode arrangement, that utilizes both RF and hardwire connections to establish a communication network between the nodes. In an embodiment, the nodes are grouped in pairs that are connected by a hardwire connection such as a fiber-optic or other shielded cable. The pairs are strung along a corridor in an end to end fashion. The nodes of each pair communicate with each other through the hardwire connection. Each node of one of the pairs communicates with an adjacent node of another of the pairs through RF communication. By this way, pairs of hardwired connected nodes can be positioned along a passage such that, where the use of hardwire is conducive, such as along a flat open-space, the hardwire may be used. Where hardwire communication is not conducive, such as up a vertical shaft or across a visibly observable region, RF communication can be used.

Figure 1:
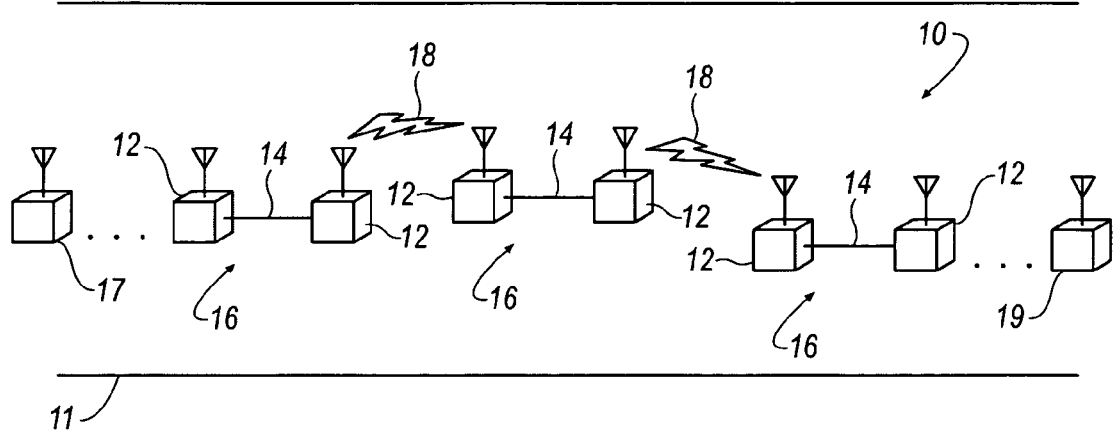
FIG. 1 is a schematic view of a multinode arrangement according to an embodiment of the invention.

Referring now to FIG. 1, a network of nodes 10 is shown positioned along a passage 11. The passage may be any space, such as an open space, a passage or any other location. The network 10 generally includes nodes 12 that communicate with each other to pass information from one end of the network 10 to the other, and specifically from object 17 to object 19 as will be described. Object 17 may be for example a digital camera and object 19 may be a receiver device or human. The nodes 12 include a transmitter/receiver that allows the nodes 12 to communicate with each other through RF broadcasts, such as for example RF broadcasts 18. Each node 12 is connected to an adjacent node 12 by a hardwire 14. In an embodiment, the hardwire 14 is a fiber-optic cable. However, it will be understood that the hardwire 14 can be any physical connection that avoids the problems associated with RF communication. For example, the hardwire 14 can be an electrical wire or other suitable means. The hardwire 14 may be a shielded cable. The fiber-optic cable additionally provides the specific advantages of high-speed data transfer as well as allowing for covert communication as the amount of RF transmissions that results from the fiber-optic cable is minimal to none.

Each of the nodes 12 are connected by a hardwire 14 to form pairs or groups 16. Groups 16, in an embodiment, are positioned in an end to end fashion as shown in the Figure. The groups 16 are positioned along the passage 11 in this fashion by a robotic device, a human or any other suitable means. Each of the nodes 12 of a group 16 communicates with the other node 12 of the group through the hardwire 14. Adjacent nodes 12 that are not connected by a hardwire 14 communicate through RF communication 18. In an embodiment, the use of RF communication 18 allows for jumps across areas in which hardwire 14 cannot be used, such as jagged or dangerous areas that may cause breakage of the hardwire 14. Also, in an embodiment, adjacent nodes 12 that communicate by RF communication 18 are preferably positioned close to each other. By this way, the close RF communication allows for high bit rates to be transferred at very low signal strength.

Figure 2:
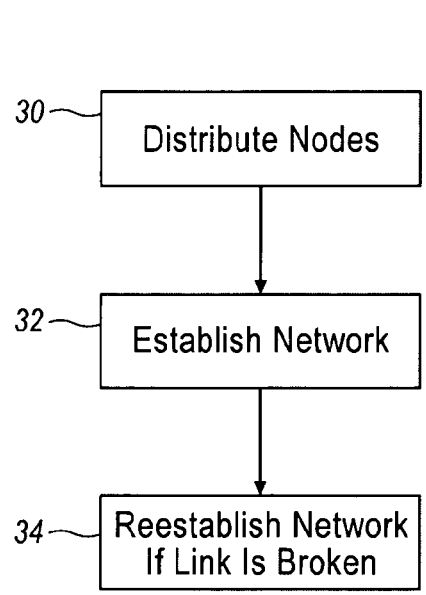
FIG. 2 is a flowchart for forming a multimode arrangement according to an embodiment of the invention.

Referring now to FIG. 2, the operation of an embodiment is described. In operation, as shown in FIG. 2, the nodes 12 are first distributed along a path as desired in step 30. The means for distributing the nodes 12 may include any known means for distributing the nodes such as use of a robotic device to deliver the nodes 12 or hand delivery of the nodes 12 by a human or other being. The nodes 12 are distributed such that at least one node 12 is positioned within optical or hardwire communication range of the object 17, while another node 12 at an opposite end of the network 10 is within hardwire or RF communication range of the object 19. Once established, the network 10 allows information to be communicated between object 10 and object 19. One skilled in the art will readily recognize additional alternatives to distributing nodes 12 along a passage or other area.

In step 32, a communication network is established between the nodes 12. The network 10 is established such that the nodes 12 that are connected by hardwire 14 communicate through the hardwire 14 while the nodes 12 that are not connected by the hardwire 14 communicate through RF communication 18. The methods used to establish this network 10 can be any known means.

In one embodiment, the network 10 in step 32 is established by first transmitting "hellos" through an RF transmission and across any connected hardwire 14 from each of the nodes 12. The "hellos" are transmissions from the node 12 to an adjacent node 12 attempting to establish communication as will be readily understood by one skilled in the art. When the adjacent node responds to the "hello", a communication link is established. Of course, other criteria, such as frequency or strength of response, may be used to determine that the communication link is established. If an adjacent node responds through both the hardwire 14 and the RF transmission 18, then the node 12 that transmitted the "hello" knows that the adjacent node 12 can communicate both through RF transmissions 18 and hardwire 14. As such, the RF transmission is not used to communicate with the adjacent node and instead the adjacent node is communicated to through the hardwire 14. Likewise, if the adjacent node 12 responds with an RF transmission only, then only an RF transmission is available for communication between adjacent nodes 12. As such, these adjacent nodes 12 communicate only through RF transmissions.

In an embodiment, the RF transmitted "hello" may be first broadcast at a high signal strength to ensure that the "hello" reaches the adjacent node 12. However, it is undesirable to continue communication and such a high signal strength once a link has been established. Specifically, a high signal strength increases power consumption and increases the possibility that the signal may be intercepted by an unintended recipient. As such, in an embodiment, once the RF link has been established between nodes 12 that are not connected with a hardwire 14, the signal strength of the established communication link is backed off until the connection is no longer established. Then, the signal strength is increased slightly to reestablish the RF connection at the minimal power required to maintain the link.

Likewise, the "hellos" are dispatched at a high frequency when the network 10 is first established. This increased frequency assists in quickly establishing the invitation link with the adjacent node 10. The establishment of the network 10 can be based on an adjacent node 12 receiving a sufficient number of "hellos." For example, the adjacent node may be required to receive k "hellos" out of n "hellos" in a certain timeframe.

Then, after the network 10 is established, the frequency of the "hellos" is reduced, but preferably is not terminated. Periodically sending "hellos" allows the network 10 to determine if a break or disruption in the network 10 occurs, as will be described in greater detail hereinafter.

In another embodiment, the signal strength of the "hellos" does not need to initially be at a maximum. Instead, by knowing predetermined characteristics of the network 10, the signal strength of the "hellos" can be estimated. More specifically, the distance between nodes 12 is determined based on predefined parameters. For example, the length of the hardwire 14 between nodes 12 as well as the distribution of the nodes 12 may be known. From this information, an estimated distance between adjacent nodes 12 can be ascertained and may be used to estimate predetermined signal strength requirements for establishing the RF communication link. By this way, the "hello" does not need to be broadcast at the maximum signal strength. Also, signal strength adjustment does not need to be made after the RF communications link has been established between the nodes 12.

Figure 3:
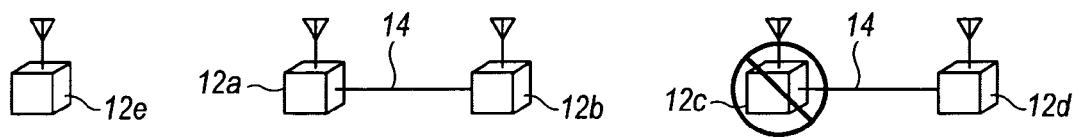
FIG. 3 is a schematic view of a multinode arrangement according to an embodiment of the invention.

In step 34, the network 10 is reestablished in the event that one of the nodes 12 or the hardwire 14 fails. Specifically, as shown in FIG. 3, nodes 12a, 12b, 12c, 12d and 12e are shown. Node 12c is shown to have failed. This failure may be due to either node 12c failing or the hardwire 14 between nodes 12c and 12d failing.

The failure of node 12c may be identified by the periodic "hellos" as described above. Specifically, during step 34, after the network 10 has been established between nodes 12, a "hello" is periodically broadcast from all of the nodes 12, including node 12b. The "hello" is used to determine whether or not any component of the network 10 has failed. In the example of FIG. 3, when the "hello" is broadcast from nodes 12b and node 12d, node 12c will not respond. In this instance, node 12b establishes an RF communication link with node 12d, bypassing node 12c and hardwire 14.

The means for reestablishing the network 10 may be the same as described above. For example, the initial "hello" may be broadcast at a high signal strength and then reduced once the communication link is made. Likewise, the network 10 may be reestablished by using known dimensions of the hardwire 14 and displacement of the nodes 12 to determine and acceptably high signal strength for broadcast. One skilled in the art will readily recognize other means for reestablishing the network 10 as well.

When an RF communication link is established between node 12b and 12d, the signal strength transmitted by node 12b is typically larger than usual due to the large distance between nodes 12b and 12d. This can cause interference in the communications between nodes 12e and 12a, as these nodes are now in range of receiving the transmission from node 12b due to its increased signal strength. Moreover, nodes 12e and 12a are most likely communicating and a low signal strength through RF transmissions. Therefore, node 12b will not be able to hear any RF communication from nodes 12e and 12a and therefore will not know to refrain from transmitting to prevent interference when nodes 12e and 12a are communicating.

An embodiment to resolve this difficulty utilizes a two-phase solution. First, when the nodes 12 are sending "hellos", the "hellos" are transmitted both by RF transmissions 18 and across the hardwire 14. The nodes 12 retain a list of which other nodes 12 are overheard on both the hardwire 14 and across the RF transmission 18. The list may be in the form of a database stored on the nodes 12 or any other known means. In the example of FIG. 3, node 12b will overhear the "hello" transmitted from node 12a across the hardwire 14 even though this node 12a and 12e are transmitting quietly with RF transmissions. Node 12b can then build a list and know which other nodes 12 may create collisions, such as node 12a.

In the second phase, by knowing that a possible collision problem exists with node 12a, node 12b can exercise communication with node 12a when node 12b intends to exercise RF communication to ensure that no collision problems are created. For example, when node 12a intends to communicate with node 12e, 12b is provided with information indicating this intention in order to defer any communications between node 12b and any other node such as node 12d. When node 12a transmits a packet of information, it sends an RTS (request to send) over the RF at low power to node 12e, and simultaneously sends the same RTS over the hardwire 14 to node 12b. Alternatively, if node 12e initiates the transmission of a packet of information, node 12e dispatches a low power RTS to node 12a over the RF (which will not be heard by node 12b). Node 12a then responds with a CTS (clear to send) that is simultaneously sent over the RF back to node 12e and over the hardwire 14 where it is detected by node 12b. As such, through either the CTS or RTS, node 12b is advised of the communication between node 12e and 12a. The RTS and CTS packets contain the length of the data. As such, in response to the RTS or CTS, node 12b refrains from transmission for a required amount of time for the transmission between nodes 12a and 12e to occur.

In addition to the collision prevention techniques described above, one skilled in the art will readily recognize other collision prevention techniques that may be used in conjunction with the present invention.

In another embodiment, inherent delay in transmitting information from one end of the network 10, between objects 17 and 19, to the other end is minimized (see FIG. 1). In such an embodiment, wormhole routing is applied to quickly dispatch packets of information from objects 17 to object 19 or vice versa. Specifically, each of the nodes 12 reviews header information in a transmitted packet to determine which path and to what node 12 the packet should be sent. The packet is not processed by any of the nodes 12, and instead is processed only when it arrives at the final destined one of objects 17 or 19. Such a method does require a fast lookup table in the nodes 12 themselves, but allows for a minimal delay over the traditional method by not attempting to service the packet until it is fully received at the destined node 12.

Figure 4:
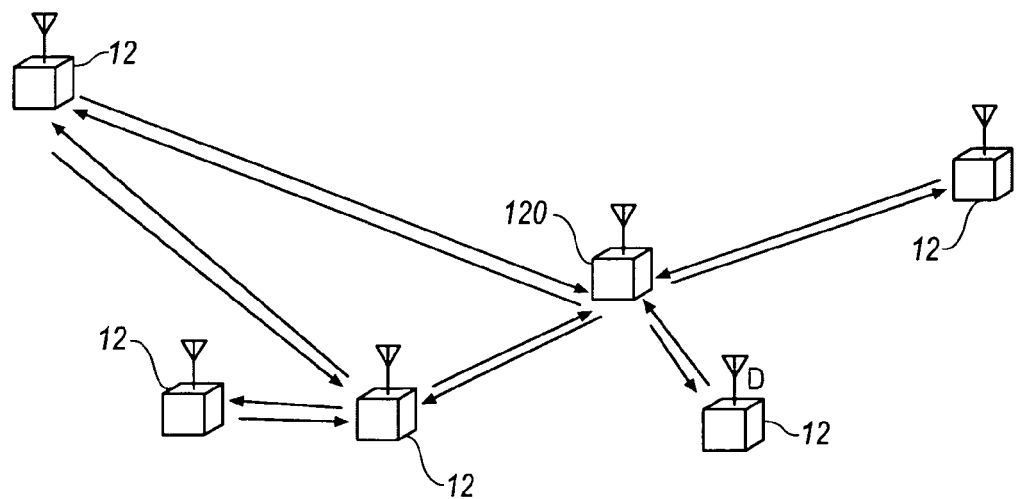
FIG. 4 is a schematic view of a multinode arrangement according to an embodiment of the invention.

Referring now to FIG. 4, another embodiment is shown and described. In FIG. 4, a situation is illustrated where a node 120 is transmitting and receiving information from a number of other nodes 12. In such a situation, node 120 is required to determine which node 12 is sending information and which node 12 is receiving information. Such a situation may arise if the nodes 12 are not positioned in an end to end manner or if there is a break in the hardwire 14 between certain nodes.

Figure 5:
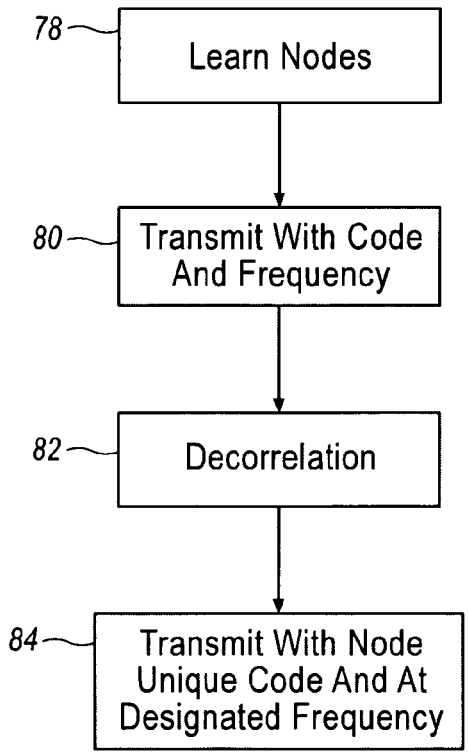
FIG. 5 is a schematic view of a multinode arrangement according to an embodiment of the invention.

It is preferable that information is transmitted quickly as described in the preceding paragraph. Accordingly, as described with reference to FIG. 5, a method is provided for ensuring that information is transmitted quickly, accurately and correctly among a plurality of nodes 12. Referring to FIG. 5, the process begins with step 78, where it must be determined which of the nodes 12 can hear transmissions from node 120. This is performed through the "hello" process as described above. For purposes of the present embodiment, the initial formation of the network is done with "hellos" sent at a predefined common spreading code (as will be discussed in greater detail below) and a predefined common frequency. This allows the nodes 12 and 120 to determine which nodes are its neighbors.

When it is determined which of the nodes 12 are neighbors of node 120, codes associated with each of those neighbors are loaded into multiple correlators in node 120. The multiple correlators or MACs allow simultaneous reception of information from multiple neighbors through simultaneous running of decorrelation by the MAC in node 120, which is commonly understood as being associated with CDMA or code division multiple access processing. This allows node 120 the ability to receive data collision free without requiring the sending node to preallocate any bandwidth.

In step 80, information is dispatched with a predefined code and at a predefined frequency from at least some of the nodes 12 in FIG. 4 to node 120. To accomplish this, however, node 120 first instructs its neighbor nodes 12 to use a predefined frequency when transmitting data to node 120. The predefined frequency assigned to nodes 12 is different then a frequency that node 120 uses to transmit data. This difference in frequency allows node 120 both receive and transmit information at the same time. The use of a different frequency to transmit data ensures that the transmitted data from node 120 does not interfere with the transmitted data from nodes 12. The neighbor nodes 12 that are transmitting data instruct node 120 that the data will be transmitted with a predefined spreading code that is unique to the transmitting node 12. Specifically, each node 12 has its own unique spreading code (as does node 120) that is used when transmitting data. As the nodes 12 are transmitting data on the same frequency, assigned by node 120, the use of different spreading codes ensures that the transmissions from nodes 12 do not interfere with each other. As such, when a node 12 dispatches a packet of information, it uses its own spreading code and the frequency that node 120 instructed it to use. At node 120, all signals are shifted to a common frequency and decorrelated from the unique spreading codes in step 82. Next, in step 84, any packets of information that node 120 needs to forward on to another neighbor 12 are then coded according to the spreading code for node 120 and shifted to the frequency that a node 12 that is intended to receive the information from node 120 instructed it to use. Since node 120 receives information on one frequency and transmits information on another frequency, it can therefore receive and transmit information simultaneously. Since node 120 receives information with different codes according to the different nodes 12, it can receive multiple packets of information simultaneously.

While the present invention has been particularly shown and described with reference to the foregoing preferred and alternative embodiments, it should be understood by those skilled in the art that various alternatives to the embodiments of the invention described herein may be employed in practicing the invention without departing from the spirit and scope of the invention as defined in the following claims. It is intended that the following claims define the scope of the invention and that the method and apparatus within the scope of these claims and their equivalents be covered thereby. This description of the invention should be understood to include all novel and non-obvious combinations of elements described herein, and claims may be presented in this or a later application to any novel and non-obvious combination of these elements. The foregoing embodiments are illustrative, and no single feature or element is essential to all possible combinations that may be claimed in this or a later application. Where the claims recite "a" or "a first" element of the equivalent thereof, such claims should be understood to include incorporation of one or more such elements, neither requiring nor excluding two or more such elements.

The invention claimed is:

1. A multinode arrangement for establishing a communication network for transmitting information between a first object and a second object, comprising:
a plurality of nodes defining a plurality of node pairs;
wherein the plurality of nodes includes at least a first node and a second node defining one of the plurality of node pairs, wherein the first node and the second node are connected by and communicate through a hardwire connection;
wherein the plurality of nodes includes at least a third node in another of the plurality of node pairs that communicates with at least the first node or the second node through an RF communication link; and
wherein said first node is configured to prevent interference of communications by refraining from communicating with one of said second node and said third node for a predetermined amount of time in response to said second node and said third node communicating with one another.

2. The multinode arrangement according to claim 1, wherein the plurality of nodes establishes a communication network between the first object and the second object.

3. The multinode arrangement according to claim 1, wherein at least one of the nodes of at least one of the node pairs includes an RF communication link to communicate with another of the nodes of a second of the node pairs.

4. The multinode arrangement according to claim 3, wherein:
the node pairs are distributed in an end to end fashion; and
each node of a node pair that is proximate a node of a different node pair includes an RF communication link to communicate with the node of the different node pair.

5. The multinode arrangement according to claim 4, wherein the node pairs are located at least partially in a passage.

6. The multinode arrangement according to claim 5, wherein:
the node pairs form a communication network between the first object and the second object; and
wherein the first object is located inside the passage and the second object is located outside the passage.

7. The multinode arrangement according to claim 6, wherein the first object is a digital camera and the second object is a device that captures digital information, wherein the communication network passes picture information from the digital camera to the device that captures digital information.

8. The multinode arrangement according to claim 4, wherein:
each node of a node pair is proximate a node of a different node pair to establish communication with the node of the different node pair by transmitting a hello signal to the node of the different node pair.

9. The multinode arrangement according to claim 8, wherein:
each node of the node pair transmits the hello signal at a predetermined frequency and signal strength.

10. The multinode arrangement according to claim 9, wherein:
each node of the node pair reduces the signal strength of the hello signal after a communication link is established with the node of the different node pair until the communication link is broken; and
each node of the node pair increases the signal strength of the hello a predefined amount after the communication link is broken to reestablish the communication link.

11. The multinode arrangement according to claim 4, wherein:
each node of the node pair establishes a second communication link with another node of the different node pair if the communication link is broken.

12. The multinode arrangement according to claim 11, further comprising a means for preventing the second communication link from interfering with another communication link between two of the plurality of nodes.

13. The multinode arrangement according to claim 4, wherein at least one of the nodes comprises a means for receiving information from multiple nodes and transmitting information to multiple nodes.

14. A multinode arrangement for establishing a communication network for transmitting information between a first object and a second object, comprising:
a communication means for communicating information from the first object to the second object across a plurality of nodes;
wherein the plurality of nodes includes at least a first node and a second node defining one of the plurality of node pairs, wherein the first node and the second node are connected by and communicate through a hardwire connection;
wherein the plurality of nodes includes at least a third node in another of the plurality of node pairs that communicates with at least the first node or the second node through an RF communication link;
a reestablishing means for reestablishing a communication link between at least two of the plurality of nodes when an original communication link between the two of the plurality of nodes is broken; and
a collision prevention means for preventing interference of communications between one node and at least two other nodes for a predetermined amount of time in response to said two other nodes communicating with one another.

15. The multinode arrangement according to claim 14, further comprising:
a noninterference means for preventing the reestablished communication link from interfering with a communication link between at least two of the plurality of nodes.

16. The multinode arrangement according to claim 14, wherein at least one of the nodes comprises a means for receiving information from multiple nodes and transmitting information to multiple nodes.

17. A method for providing a communication network between a first object and a second object, comprising:
providing a plurality of node pairs, wherein each of the node pairs comprises at least two nodes that are connected by and communicate through a hardwire connection;
distributing the plurality of node pairs between the first object and the second object;
establishing a communication network by linking nodes of node pairs with nodes of other node pairs, wherein the linking comprises RF communication links; and
configuring one of said nodes to prevent interference of communications by refraining from communicating with at least two other nodes for a predetermined amount of time in response to said two other nodes communicating with one another.

18. The method according to claim 17, wherein for each node of a node pair, the step of establishing further comprises:
transmitting a hello to a node of an adjacent node pair; and establishing a communication link between the node and the adjacent node if a response is received from the adjacent node.

19. A method according to claim 18, further comprising:

transmitting the hello at a predefined signal strength;

reducing the signal strength if the response is received until the communication link is broken; and increasing the signal strength a predetermined amount to reestablish the communication link.

20. The method according to claim 17, for any of the nodes of the node pairs, further comprising reestablishing an RF communication link between the node and an adjacent node pair if the RF communication link between the node and an adjacent node of the adjacent node pair is broken.

21. The method according to claim 20, wherein the step of reestablishing further comprises:

transmitting a hello from the node;

receiving the hello with another node of the adjacent node pair; and establishing the second RF communication link between the node and the other node of the adjacent node pair.

* * * * *